No. 723,407. PATENTED MAR. 24, 1903.
E. E. RICKER.
CAKE BEATER.
APPLICATION FILED SEPT. 2, 1902.
NO MODEL.

Witnesses: L. H. Orwig. Henry Manger.

Inventor: Ella E. Ricker.
By Thomas G. Orwig, Attorney.

UNITED STATES PATENT OFFICE.

ELLA E. RICKER, OF GRINNELL, IOWA.

CAKE-BEATER.

SPECIFICATION forming part of Letters Patent No. 723,407, dated March 24, 1903.

Application filed September 2, 1902. Serial No. 121,857. (No model.)

*To all whom it may concern:*

Be it known that I, ELLA E. RICKER, a citizen of the United States, residing at Grinnell, in the county of Poweshiek and State of Iowa, have invented certain new and useful Improvements in Cake-Beaters, of which the following is a specification.

My object is to provide an improved device to facilitate the work and save time in mixing and beating ingredients to make cake, bread, &c., as required to produce the best results in the culinary and baker's art that requires manual labor such as has heretofore been performed to a great extent with spoons.

My invention consists in the device hereinafter set forth, pointed out in my claim, and illustrated in the accompanying drawings, in which—

Figure 1:
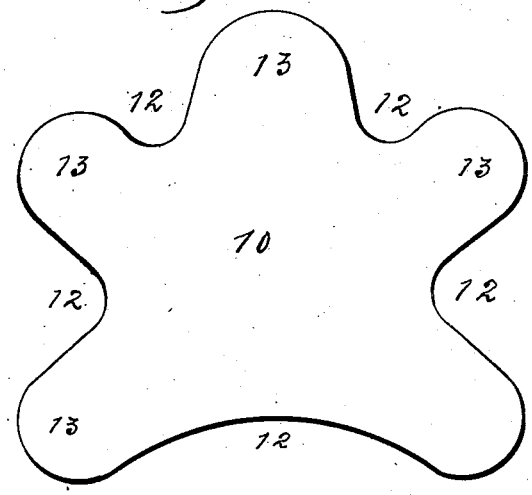
Figure 2:
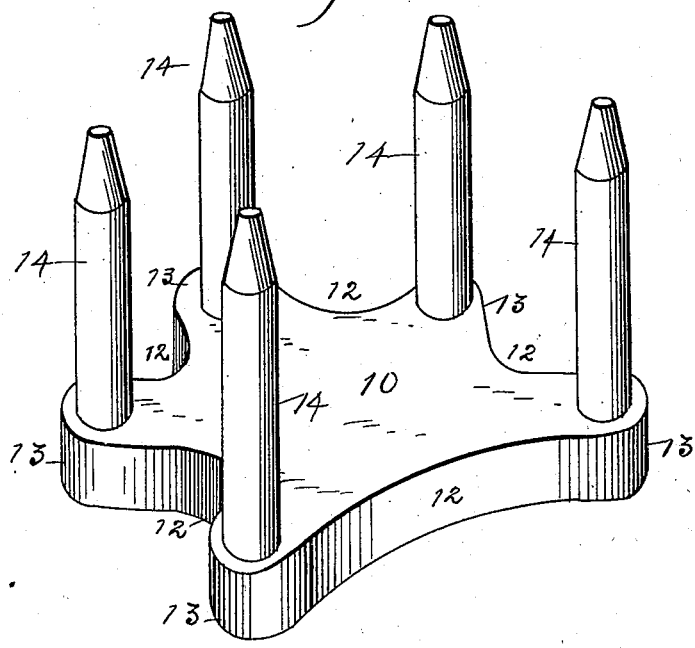

Figure 1 is a top view that shows the configuration of the part that is specially adapted to be grasped and firmly held in a person's hand as required to advantageously stir and mix and beat matter that is to be prepared for baking. Fig. 2 is a perspective view that shows the device in an inverted position and the relative position of the fingers that project from the knuckles of the handpiece to which they are fixed.

The numeral 10 designates a rigid handpiece, preferably made of hard wood and specially adapted to be grasped in a person's hand on account of four notches 12 in its edge, that are contiguous to each other and correspond to the four fingers of a person's hand, that will enter the notches for securing a firm hold of the beater and operating artificial fingers fixed to the artificial knuckles at the circumference of the flat handpiece to extend over a wider space than human fingers can. By means of the notches four knuckles 13 are produced and specially adapted for fixing rigid fingers 14, preferably made of hard wood, thereto, as shown, in such a manner that the wooden fingers will be widely separated from each other, and the complete device may appropriately be termed an "enlarged rigid hand" specially adapted for thoroughly mixing and beating milk and butter and flour and other ingredients together by manual labor without getting a person's hand in contact with the adhesive matter or experiencing the annoyances incident to putting a person's hand into such mixtures.

Heretofore a flat plate has had fixed needles in its under side and a fixed handle arched over its top for holding the device and thrusting the needles into dough and forming holes or cells for the admission of air; but such a device is not adapted for applying hand-power as required to stir and temper a stiff dough as contemplated by my invention, by which the handpiece to which the rigid fingers are fixed in such a manner that the mixer can be advantageously used by applying force direct to the handpiece and a handle dispensed with and the device placed in an inverted position when not in use for advantageously taking care of it.

Having thus described the purpose of my invention and its construction, the practical utility thereof will be obvious to tidy housekeepers and persons familiar with the art to which it pertains, and

What I claim as new, and desire to secure by Letters Patent, is—

A cake-beater consisting of a flat handpiece having five notches in its edge adapted to admit the fingers and thumb of a human hand and to produce knuckles and five knuckles projected outward from the flat handpiece and a finger fixed to each knuckle to project downward, as shown and described for the purposes stated.

ELLA E. RICKER.

Witnesses:
 WILL C. RAYBURN,
 O. W. BEDEN.